(12) United States Patent
Balasubramanian et al.

(10) Patent No.: US 10,547,469 B2
(45) Date of Patent: Jan. 28, 2020

(54) SYSTEM, METHOD, AND RECORDING MEDIUM FOR ADJUSTING AMBIENCE OF A ROOM

(71) Applicant: International Business Machines Corporation, Armonk, NY (US)

(72) Inventors: Swaminathan Balasubramanian, Troy, MI (US); Krisha Banerjee, West Bengal (IN); Radha Mohan De, West Bengal (IN); Ashley Dallas Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 15/223,145

(22) Filed: Jul. 29, 2016

(65) Prior Publication Data
US 2018/0034656 A1    Feb. 1, 2018

(51) Int. Cl.
*H04L 12/28*    (2006.01)
*H04L 29/08*    (2006.01)

(52) U.S. Cl.
CPC ........ *H04L 12/2807* (2013.01); *H04L 67/125* (2013.01); *H04L 67/306* (2013.01)

(58) Field of Classification Search
CPC ............. H04L 12/2807; H04L 41/0813; H04L 67/125; H04L 67/306
USPC ......................................................... 709/220
See application file for complete search history.

(56) References Cited

U.S. PATENT DOCUMENTS

| | | | | |
|---|---|---|---|---|
| 8,131,875 B1* | 3/2012 | Chen | ................. | H04M 1/72522 707/E17.121 |
| 10,031,722 B1* | 7/2018 | Mutagi | .................... | G10L 15/22 |
| 2010/0161149 A1* | 6/2010 | Nguyen | .................. | G06F 1/266 700/296 |
| 2015/0066853 A1* | 3/2015 | Martin | .................. | G06F 16/173 707/626 |
| 2015/0105918 A1* | 4/2015 | Lee | ...................... | F24D 19/1084 700/276 |
| 2015/0319038 A1* | 11/2015 | Spencer | ............. | H04L 41/0803 370/254 |
| 2016/0065653 A1* | 3/2016 | Chen | ....................... | H04L 67/10 715/735 |
| 2016/0105292 A1* | 4/2016 | Choi | ....................... | H04L 51/02 709/206 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Nicholas R Taylor
*Assistant Examiner* — Chong G Kim
(74) *Attorney, Agent, or Firm* — Anthony Curro, Esq.; McGinn IP Law Group, PLLC

(57) ABSTRACT

An ambience adjustment method, system, and non-transitory computer readable medium, includes configuring an ambient condition of a first device detected in an environment to match an ambient condition of a similar device in a user profile, identifying a change to the ambient condition of the first device configured by the configuring, and updating the user profile with a new ambient condition based on the identified change to the ambient condition.

20 Claims, 4 Drawing Sheets

(56) References Cited

U.S. PATENT DOCUMENTS

| | | | |
|---|---|---|---|
| 2016/0197798 A1* | 7/2016 | Britt | H04W 4/70 |
| | | | 370/254 |
| 2016/0248847 A1* | 8/2016 | Saxena | H04L 67/18 |
| 2016/0260135 A1* | 9/2016 | Zomet | H04L 12/2812 |
| 2016/0344815 A1* | 11/2016 | Hyun | H04L 67/125 |
| 2016/0359864 A1* | 12/2016 | Dhaliwal | H04L 63/102 |
| 2016/0377307 A1* | 12/2016 | Fadell | G05D 23/1902 |
| | | | 700/278 |

* cited by examiner

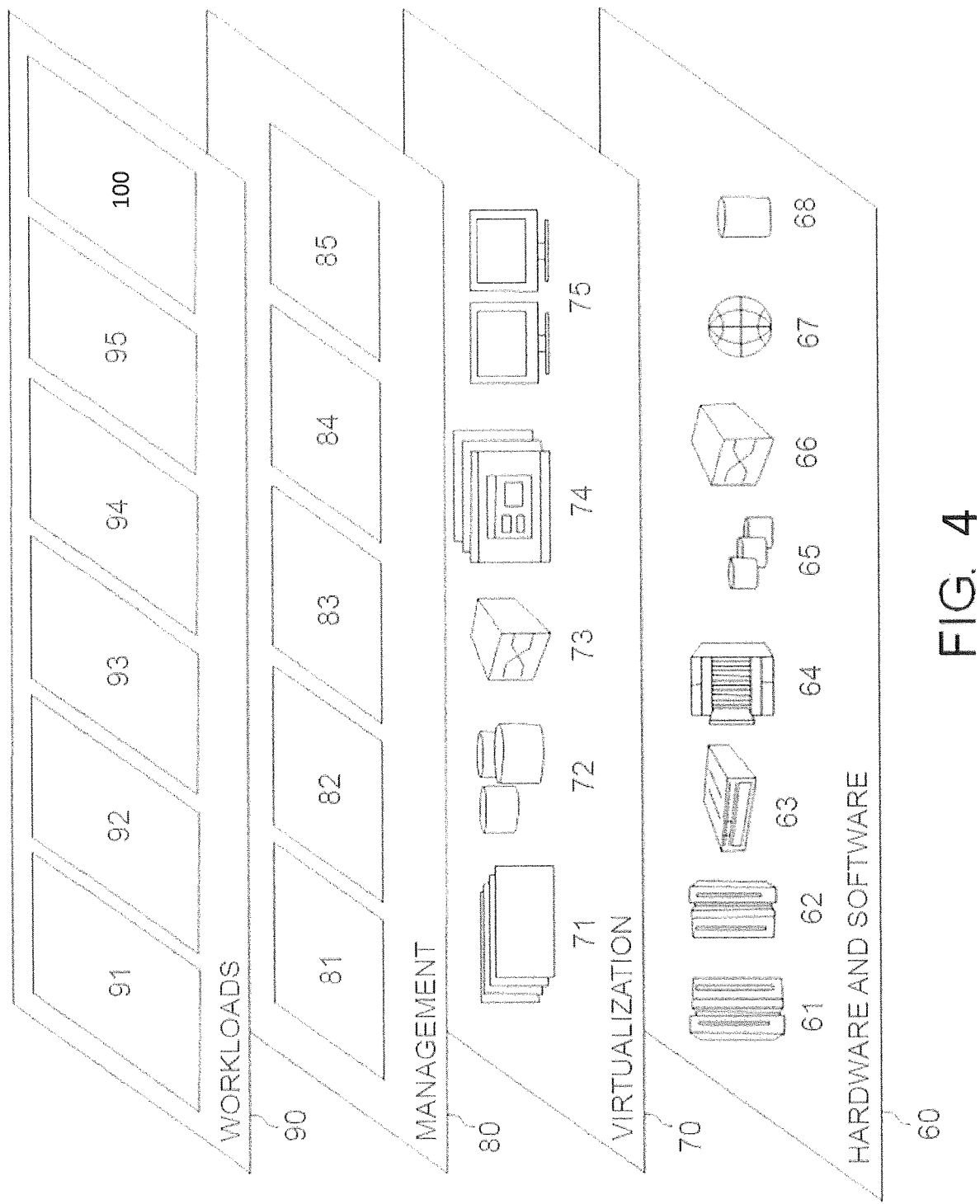

SYSTEM, METHOD, AND RECORDING MEDIUM FOR ADJUSTING AMBIENCE OF A ROOM

BACKGROUND

The present invention relates generally to an ambience adjustment method, and more particularly, but not by way of limitation, to a system, method, and recording medium for adjusting ambience of a room with an Internet of Things (IoT)-aided application using pre-configured ambience information.

People feel uncomfortable in an unknown environment, e.g., hotel room, friend's house, etc. they are visiting. The sense of uncomfortableness, unfamiliarity, or disconnection is increased when the unknown environment has different room temperature settings, light preferences, device configurations, etc. from the preferential settings in such people's home environment.

Conventional ambience manipulation techniques include an artificial space station for training of aspiring astronauts in which environmental or ambience can be simulated and/or controlled. For example, where certain environmental or ambience factors such as pressure, temperature, and humidity (to name just a few) can be controlled to make an enclosed room feel like it would in space. However, these techniques attempt to re-create a specific type of ambient condition in a room.

Thus, there is a need in the art for improved techniques regarding the adjustment of an unknown environment to reflect a preferred ambient condition.

SUMMARY

In an exemplary embodiment, the present invention can provide an ambience adjustment method, the method including configuring an ambient condition of a first device detected in an environment to match an ambient condition of a similar device in a user profile, identifying a change to the ambient condition of the first device configured by the configuring, and updating the user profile with a new ambient condition based on the identified change to the ambient condition.

Further, in another exemplary embodiment, the present invention can provide a non-transitory computer-readable recording medium recording an ambience adjustment program, the program causing a computer to perform: configuring an ambient condition of a first device detected in an environment to match an ambient condition of a similar device in a user profile, identifying a change to the ambient condition of the first device configured by the configuring, and updating the user profile with a new ambient condition based on the identified change to the ambient condition.

Even further, in another exemplary embodiment, the present invention can provide an ambience adjustment system, said system including a user profile database, a processor, and a memory, the memory storing instructions to cause the processor to: configure an ambient condition of a first device detected in an environment to match an ambient condition of a similar device in a user profile, identify a change to the ambient condition of the first device configured by the configuring, and update the user profile with a new ambient condition based on the identified change to the ambient condition.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 4 depicts abstraction model layers according to an embodiment of the present invention.

DETAILED DESCRIPTION

Figure 1:
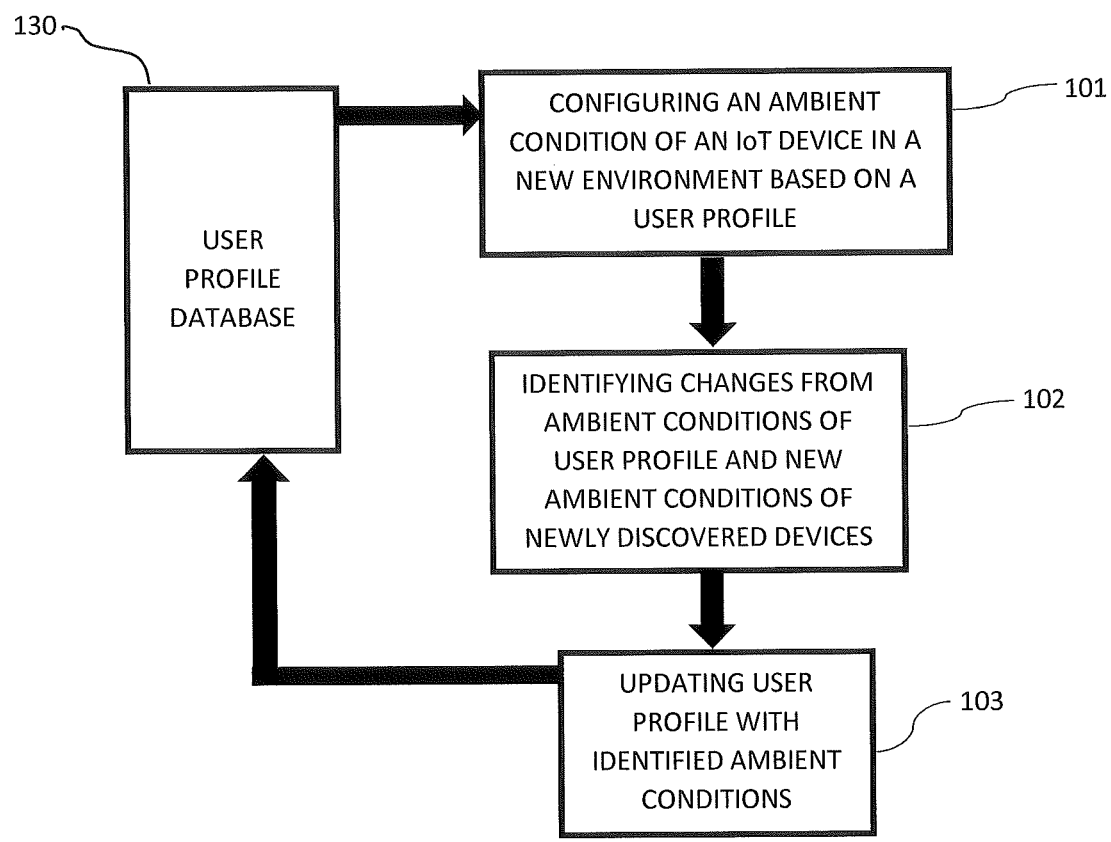
FIG. 1 exemplarily shows a high-level flow chart for an ambience adjustment method 100.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the ambience adjustment method 100 includes various steps to configure the ambient conditions of an unknown environment (e.g., a new room or location that the user has not been yet) based on previous ambient conditions stored in a user profile database 130 (e.g., such as ambient conditions from the user's home, a hotel room that has previously been visited, etc.). Moreover, the method (system) can benefit from "learning" from changes to past preferences of ambient conditions such as the user adjusting the ambient conditions or identify new ambient conditions for an IoT enabled device that were not previously stored in the user profile database 130. As shown in at least FIG. 2, one or more computers of a computer system 12 can include a memory 28 having instructions stored in a storage system to perform the steps of FIG. 1.

With the use of these various steps and instructions, the ambience adjustment method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 2:
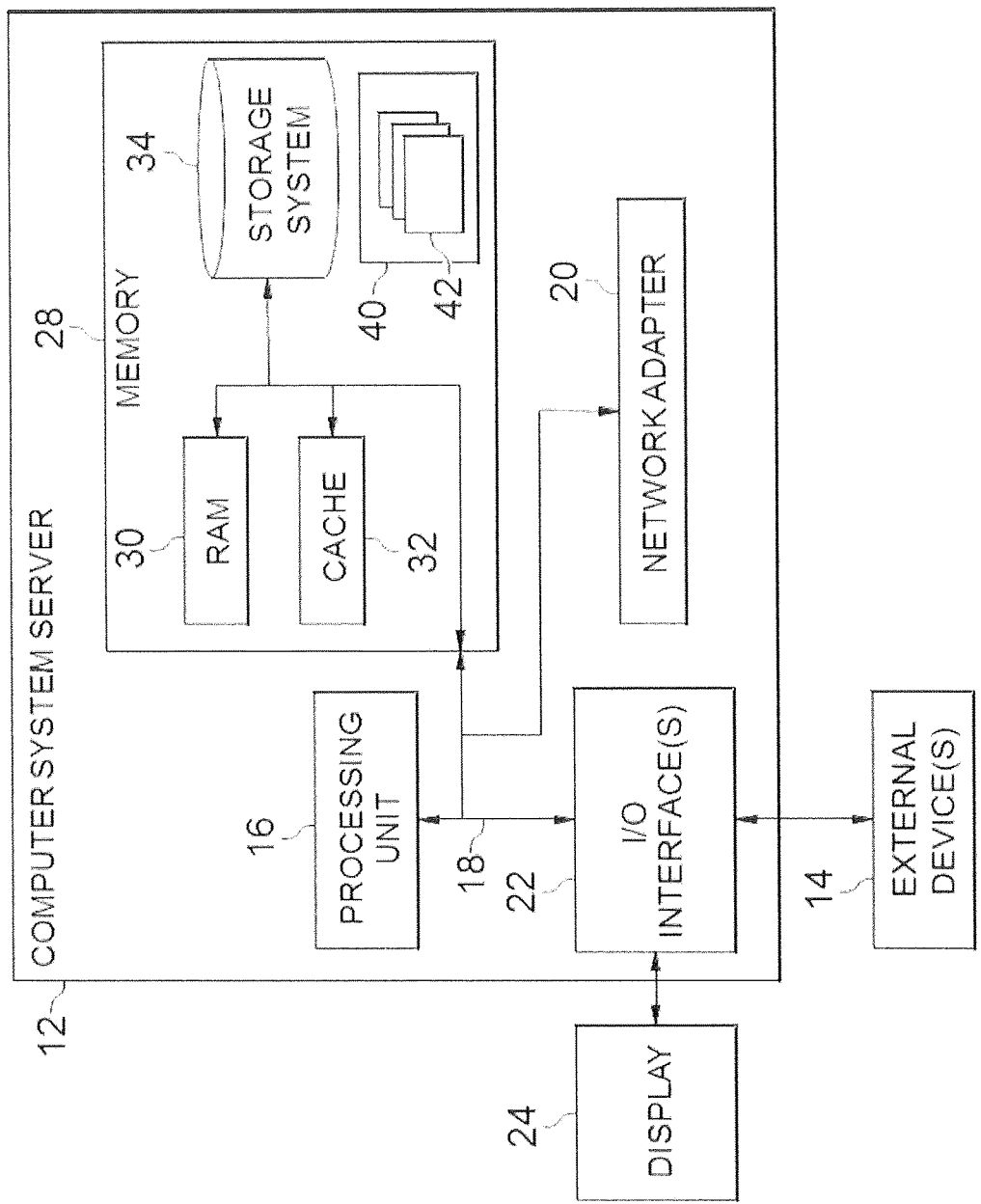
FIG. 2 depicts a cloud computing node according to an embodiment of the present invention.
Figure 3:
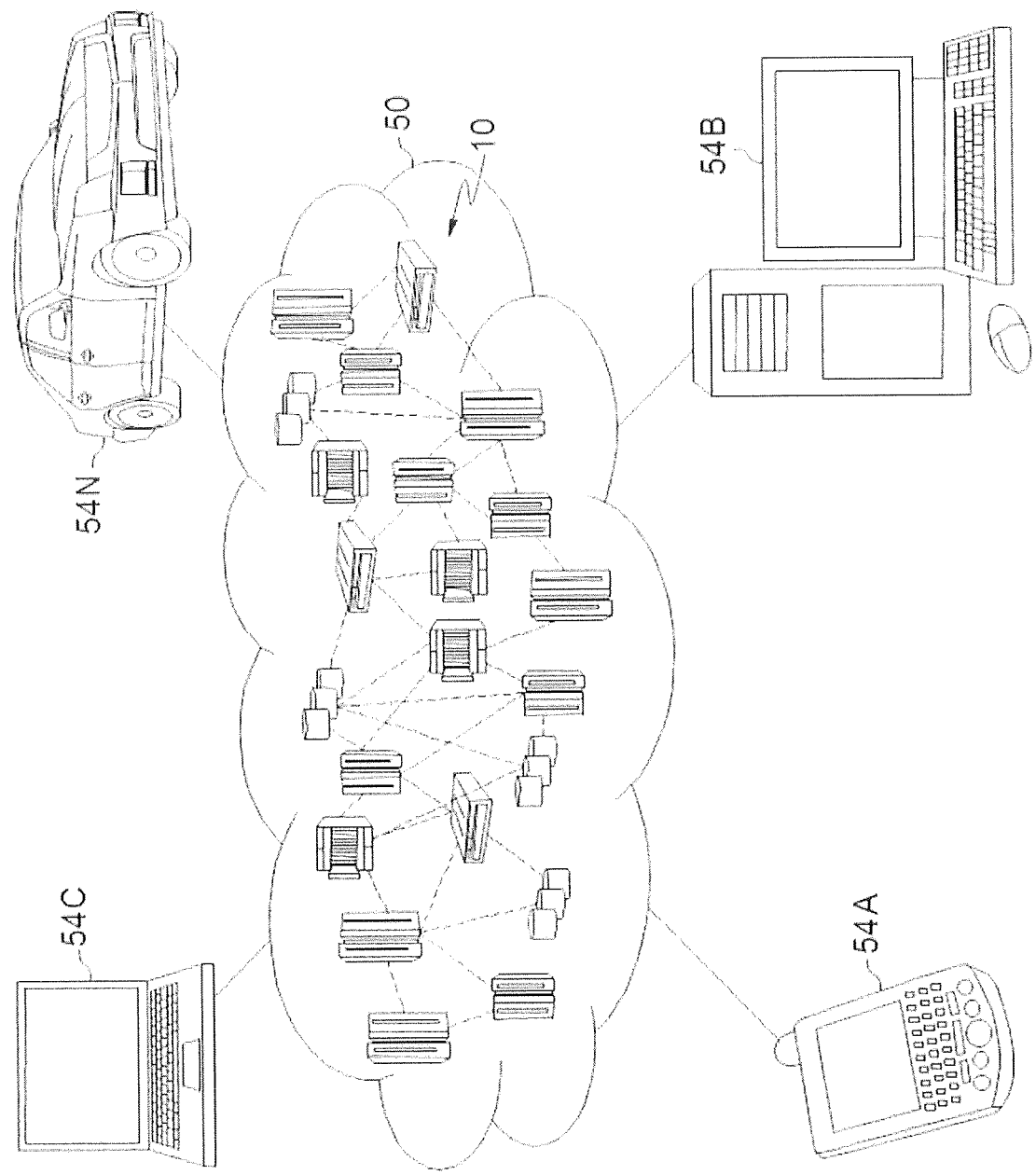
FIG. 3 depicts a cloud computing environment according to another embodiment of the present invention.

Although as shown in FIGS. 2-4 and as described later, the computer system/server 12 is exemplarily shown as one or more cloud computing nodes 10 of the cloud environment 50 as a general-purpose computing circuit which may execute in a layer the ambience adjustment system method (FIG. 3), it is noted that the present invention can be implemented outside of the cloud environment.

Step 101 configures an ambient condition of an Internet of Things (IoT) device in a new environment based on a user profile stored in the user profile database 130. That is, Step 101 configures the device of the new environment to have a condition match the ambient condition of the user profile. It is noted that Step 101 assumes that a user profile has already been set up for the user. That is, the user has previously set ambient conditions of devices and Step 102 (as described later) has learned the ambient conditions to add to the user profile for the devices.

That is, Step 101 can configure an ambient condition of a device detected in an environment to match an ambient condition of a similar device in a user profile. It is noted that a similar device does not need to be the exact same type of device (e.g., a sofa matching a sofa in the user profile) but can be a device including a setting that is the same between the device and the similar device of the user profile (e.g., a sofa and a bed can include a firmness setting). Therefore, in one embodiment, a similar device having a setting of the detected device be configured to match a different type of device having a same type of setting.

It is noted that the configuring can be a result of a user entering a room and the user profile being broadcasted or the user profile being pushed (pulled) to a specific device. In other words, one or several devices in a new environment can receive the ambient condition 'broadcast' and respond by configuring their respective ambient conditions. Alternatively, one or several devices in the new environment can be pushed the profile (or pull the profile) and configure their respective settings.

Step 102 identifies changes by the user to the configured ambient conditions of the devices from Step 101 and identifies new ambient conditions for newly discovered devices.

Step 103 updates the user profile based on the identifies changes from Step 102 or based on the new ambient conditions of the newly discovered devices.

In one embodiment, Step 101 can configure an IoT device such as a temperature control unit to set a first temperature based on the ambient condition in the user profile. If the user manually changes the temperature to a second temperature, Step 102 identifies the change to the temperature such that Step 103 can update the user profile of the user profile database 130 with the second temperature. Thereby, Step 101 can configure an ambient condition of the temperature control unit to be the second temperature the next time the user enters a new environment including a temperature control unit. Also, Step 102 identifies ambient conditions for new devices if an ambient condition is set on a newly discovered device (e.g., such as a new type of mattress that allows a user to set the firmness of the mattress) and Step 103 updates the user profile with the new ambient condition for the new device. Thus, the user profile can be continuously updated for devices in new environments such that the same device in another environment can be configured to match the ambient conditions of the user profile. For example, if the user's home does not have the new type of mattress, but if a hotel has the new type of mattress and the user manually sets the firmness of the mattress while staying at the hotel, if the user is in another environment with the matching mattress, Step 101 can configure the mattress to the desired firmness settings (e.g., the ambient condition).

In another exemplary embodiment, a user enters into an environment such as the user's home with the method 100 activated for the first time. Since there has not been a user profile set up for the devices in the user's home, Step 101 is skipped (e.g., no user profile with ambient conditions has been set to configure the devices in the environment) and Step 102 begins to identify the new devices in the environment. That is, Step 102 discovers different devices inside the environment to connect with them using, for example, a BLE/Zigbee protocol.

Step 102 identifies the new ambient conditions of the discovered devices in the room. For example, Step 102 identifies that the ambient condition for the desk is in a position near window and at a height of 32 inches, a chair at a position opposite to the window and at a height of 22 inches, the bed at a position opposite the window, at a height of 22 inches, and having a particular mattress firmness setting, an alarm clock at a position near the bed having an alarm set daily at 5 A.M. with a tone volume increasing as the alarm sounds off, a telephone set to have a particular ring tone, a floor lamp positioned near the bed and having a luminescence of 1200 lumens, curtains that are half-closed and are light green, and the television is set to a particular volume when turned on and faces the bed.

Step 103 updates the user profile in the user profile database 130 with the identified ambient conditions for each device identified in Step 102. Or, in the embodiment above, Step 103 creates the user profile for the devices with the identified ambient conditions.

Thereby, if the user returns to the environment at a later time and a device has been moved, a setting changed, etc., Step 101 configures the ambient conditions of the devices to match the ambient conditions of the user profile. As such by the identifying, the system can "learned" the user's preferences and inserts them into the user's profile. That is, Step 101 causes the devices to collectively decide the layout rearrangement sequence based on specific rules, size of the devices, features of the devices, to configure the devices to match the ambient conditions of the user profile.

When the user indicates that the user is going to a new environment at a future time (e.g., sets a time for the devices to be configured) or enters a new environment (e.g., a new room such as a hotel room, a different home, etc.), Step 101 discovers the devices in the new environment through one or more known protocols, such as for example, the Bluetooth Low Energy ("BLE") or Zigbee protocol. When a device in the new environment matches a device of the user profile, Step 101 configures the ambient condition of the devices to match the ambient condition set for the device in the user profile.

In other words, once Step 101 finds some matching component in new environment, Step 101 configures the devices based on, for example, generating a map among them in the format as: "TV-from-user profile: TV-in-new-environment" "Bed-from-user profile: Bed-in-new-environment"; "Curtain-from-user profile: Curtain-in-new-environment"; and "Chair-from-user profile: Chair-in-new-environment" such that the ambient conditions from the user profile are set to device in the new environment. That is, Step 101 overrides the current ambient condition of the devices that match a device in the user profile and configures the device to match the ambient condition of the user profile from the known environment.

It is noted that the user profile can be set such that the configuration of Step 101 can copy the ambient condition from a device in the user profile to new device in the new environment in more fine grained form, such as in a more granular level configuration.

After the ambient conditions of the devices in the new environment have been configured by Step 101, Step 102 identifies changes to the ambient conditions in the new environment. For example, if the user changes the firmness setting of the bed, Step 102 identifies the change to the ambient condition of the bed and Step 103 updates the user profile to store the new ambient condition of the firmness setting of the bed. That is, if the user changes their preference in the ambient condition, Step 102 identifies the change to the user preference and updates the user profile in Step 103 such that the next time the user enters a room with a matching device, the device is automatically configured (e.g., via Step 101) to have the updated, more preferential, ambient condition.

Similarly, if the new environment includes a device that does not match a device including ambient conditions in the user profile, Step 102 identifies the new ambient conditions of the new device and Step 103 updates the user profile with the ambient conditions for the device. For example, some users may frequently visit a particular hotel with a type of device that they do not have in any other environment available to them (e.g., a type of television, a bed, a type of temperature control unit, etc.) and by Step 102 identifying the ambient conditions of the new device and updating the user profile with the ambient conditions, Step 101 can automatically configure the devices in the environment with the ambient conditions preferred by the user.

In one embodiment, a room's ambience tends to change through the day, based on a time of year, or external conditions such as outside temperature, precipitation amounts, etc. For instance, curtains may be drawn or closed based on sunlight entering the room, an air conditioning system may be programmed to a specific schedule etc. If the user has programmed their ambience (i.e., the programmable entities in their room) to such a schedule, then Step 102 identifies this schedule and the user profile is updated by Step 103 with the schedule factor such that the new environment is configured based on the ambient conditions according to the preferred schedule. When in a new setting (e.g., a hotel room), the Step 101 configures the ambient condition taking into account the location of the new setting, external weather conditions, length of stay, etc. as stored in the user profile.

In one embodiment, the identifying can trigger a command to the user to give feedback such as a rating on a scale of one to five how the user rates the configuration of the devices in the new environment. Therefore, the method 100 can identify if the devices are configured properly and potentially detect faults with the configuration of a device (e.g., a light is turned on in the middle of the night and deleting such a configuration if there is no reason for the same).

That is, there are many options available in today's world where IoT enabled ambience, e.g., light, television, fridge, smarter furniture, air conditioning, sanitary systems, etc. are operating across dwelling places. The method 100 enables preferential setup of different types of devices in a known ambience (e.g., a user profile) with a, for example, mobile application, so that the method 100 can act as an ambience simulator in new environments. Therefore, when the user needs to stay in a new environment (or any environment previously visited with IoT enabled devices), the method 100 can match each type of device in the new environment to a device in the user profile and keep their settings in parity (e.g., configure the settings of the devices to match).

Further, although the environment was described above as relating to a room, the environment can include a car, a plane, a boat, a theater, etc. so long as the environment has IoT enabled devices that can be detected and configured to match the ambient conditions of the user profile.

Thus, the inventors have realized at least one technical solution to a technical problem to improve a computer-technology (e.g., IoT technology) via method 100 by discovering ambience components (e.g., IoT-enabled devices), match each discovered component with one from a preferred or default environment (e.g., a user's home), and after the match, copy matching setup information from the preferential component in the preferred environment and override the same for a component a in new environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 2, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the ambience adjustment method 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An ambience adjustment method, the method comprising:
    configuring an ambient condition of a first device detected in an environment to match an ambient condition of a similar device in a user profile;
    identifying a change to the ambient condition of the first device configured by the configuring;
    updating the user profile with a new ambient condition based on the identified change to the ambient condition; and
    detecting a second device,
    wherein if the second device does not match the similar device in the user profile, the identifying identities an ambient condition in the user profile for a most similar first device to the second device and the updating sets the ambient condition of the most similar first device as the ambient condition in the user profile of the second device, and wherein the configuring configures a new condition in the user profile for the second device when there is no most similar device in the user profile to the second device, and the method further comprising outputting an update to the user profile that includes the change to the ambient condition of the first device.

2. The method of claim 1, wherein the configuring configures the ambient condition of the first device to match the new ambient condition of the updated user profile after the identifying identifies the change to the ambient condition.

3. The method of claim 1, wherein if the second device does not match a similar device in the user profile, the identifying identifies an ambient condition of the second device and the updating updates the user profile with the ambient condition of the second device.

4. The method of claim 1, wherein the identifying further identifies a programmable setting associated with the similar device in the user profile such that the configuring configures the first device according to the programmable setting of the similar device.

5. The method of claim 4, wherein the programmable setting comprises at least one of:
an external weather condition;
a time of day;
a time of year;
a length of stay in the environment; and
a location of the new setting.

6. The method of claim 1, wherein the first device comprises an Internet of Things (IoT)-enabled device.

7. The method of claim 1, embodied in a cloud-computing environment.

8. The method of claim 1, wherein the first device is detected via a protocol selected from a group consisting of a Bluetooth Low Energy (BLE) and ZigBee protocol.

9. The method of claim 1, wherein the configuring configures an ambient condition for each of a plurality of devices detected in the environment to match an ambient condition of a similar device in the user profile, and
wherein the configuring further determines a configuration sequence to rearrange each of the plurality of devices to match the ambient condition of the similar device in the user profile.

10. The method of claim 1, wherein the identifying identifies the change to the ambient condition of the first device configured by the configuring such that the next time the configuring configures the first device, the first device is configured to have the changed ambient condition.

11. A non-transitory computer-readable recording medium recording an ambience adjustment program, the program causing a computer to perform:
configuring an ambient condition of a first device detected in an environment to match an ambient condition of a similar device in a user profile;
identifying a change to the ambient condition of the first device configured by the configuring;
updating the user profile with a new ambient condition based on the identified change to the ambient condition; and
detecting a second device,
wherein if the second device does not match the similar device in the user profile, the identifying identifies an ambient condition in the user profile for a most similar first device to the second device and the updating sets the ambient condition of the most similar first device as the ambient condition in the user profile of the second device, and
wherein the configuring configures a new condition in the user profile for the second device when there is no most similar device in the user profile to the second device, and
further comprising outputting an update to the user profile that includes the change to the ambient condition of the first device.

12. The non-transitory computer-readable recording medium of claim 11, wherein the configuring configures the ambient condition of the first device to match the new ambient condition of the updated user profile after the identifying identifies the change to the ambient condition.

13. The non-transitory computer-readable recording medium of claim 11,
wherein if the second device does not match a similar device in the user profile, the identifying identifies an ambient condition of the second device and the updating updates the user profile with the ambient condition of the second device.

14. The non-transitory computer-readable recording medium of claim 11, wherein the identifying further identifies a programmable setting associated with the similar device in the user profile such that the configuring configures the first device according to the programmable setting of the similar device.

15. The non-transitory computer-readable recording medium of claim 14, wherein the programmable setting comprises at least one of:
an external weather condition;
a time of day;
a time of year;
a length of stay in the environment; and
a location of the new setting.

16. An ambience adjustment system, said system comprising:
a user profile database;
a processor; and
a memory, the memory storing instructions to cause the processor to:
configure an ambient condition of a first device detected in an environment to match an ambient condition of a similar device in a user profile;
identify a change to the ambient condition of the first device configured by the configuring;
update the user profile with a new ambient condition based on the identified change to the ambient condition; and
detect a second device,
wherein if the second device does not match the similar device in the user profile, the identifying identifies an ambient condition in the user profile for a most similar first device to the second device and the updating sets the ambient condition of the most similar first device as the ambient condition in the user profile of the second device, and
wherein the configuring configures a new condition in the user profile for the second device when there is no most similar device in the user profile to the second device, and
further comprising outputting an update to the user profile that includes the change to the ambient condition of the first device.

17. The system of claim 16, wherein the processor further configures the ambient condition of the first device to match the new ambient condition of the updated user profile after the identifying identifies the change to the ambient condition.

18. The system of claim 16,
wherein if the second device does not match a similar device in the user profile, the identifying identifies an ambient condition of the second device and the updating updates the user profile with the ambient condition of the second device.

19. The system of claim 16, wherein the processor further identifies a programmable setting associated with the similar device in the user profile such that the configuring configures the first device according to the programmable setting of the similar device.

20. The system of claim 19, wherein the programmable setting comprises at least one of:
an external weather condition;
a time of day;
a time of year;
a length of stay in the environment; and
a location of the new setting.

* * * * *